US012600047B2

(12) United States Patent
Freedman et al.

(10) Patent No.: US 12,600,047 B2
(45) Date of Patent: Apr. 14, 2026

(54) SAFETY KNIFE

(71) Applicants: Melvin Freedman, Highland Park, IL (US); Thomas Landwehr, De Pere, WI (US)

(72) Inventors: Melvin Freedman, Highland Park, IL (US); Thomas Landwehr, De Pere, WI (US)

(73) Assignee: RITESAFETY PRODUCTS INTERNATIONAL, LLC, De Pere, WI (US)

( * ) Notice: Subject to any disclaimer, the term of this patent is extended or adjusted under 35 U.S.C. 154(b) by 173 days.

(21) Appl. No.: 18/114,351

(22) Filed: Feb. 27, 2023

(65) Prior Publication Data

US 2024/0286299 A1 Aug. 29, 2024

(51) Int. Cl.
*B26B 1/08* (2006.01)
*B26B 1/10* (2006.01)

(52) U.S. Cl.
CPC . *B26B 1/08* (2013.01); *B26B 1/10* (2013.01)

(58) Field of Classification Search
CPC .............. B26B 1/08; B26B 1/10; B26B 5/003
USPC ............................................................ 30/162
See application file for complete search history.

(56) References Cited

U.S. PATENT DOCUMENTS 6,148,520 A * 11/2000 Berns ...................... B26B 5/003 30/162
6,775,911 B2 * 8/2004 Tremblay ................ B26B 5/003 30/162
7,765,701 B2 * 8/2010 Okada ..................... B26B 5/003 30/162
2002/0029482 A1 3/2002 Peyrot et al.
2004/0025354 A1 * 2/2004 Lemisch ................... B26B 1/04 30/153
2014/0013605 A1 * 1/2014 Wu ......................... B26B 5/003 30/162
2018/0281209 A1 * 10/2018 Landwehr .............. B26B 5/003

* cited by examiner

*Primary Examiner* — Nhat Chieu Q Do
(74) *Attorney, Agent, or Firm* — Donald J. Ersler

(57) ABSTRACT

A safety knife with a knife body 10 with a cavity and an opening at a front end, a trigger mechanism operable outside the body 10 including a trigger slide 22 located in the cavity and slidable from a rear position to a front position. A blade holder 32 for securely holding a blade 31, located in the cavity and movable from a safety position, where the blade 31 is completely within the body 10. The blade 31 having an extended position, where the blade 31 extends out of the opening at the front end of the body 10, rotatable in the extended position into a rotated position. The trigger slide 22 equipped with a trigger coupling surface 24 and the blade holder 32 equipped with a holder coupling surface 34. The coupling surfaces 24, 34 in contact with each other in a plane essentially parallel to a longitudinal axis of the body 10 and connected by a coupling means when in contact with each other.

2 Claims, 3 Drawing Sheets

SAFETY KNIFE

FIELD OF THE INVENTION

The present invention relates to a safety knife with a blade that can be extended and is automatically retracted after use to reduce the risk of injury to a user.

BACKGROUND OF THE INVENTION

Safety for the user of a handheld knife with an extendable blade is improved by providing an automated mechanism, which retracts the blade into the body of the knife as soon as the cutting action is completed.

Examples of early knives using this kind of mechanism are shown in U.S. Pat. No. 6,148,520 A or US 2002029482 A1. In order to achieve the desired functionality the knives include a blade holder and a trigger slide. In the retracted position the trigger slide and the blade holder are connected by a coupling mechanism, comprising an abutment formed by an extension on the trigger slide or on the blade holder or an extension on each part. Movement of the trigger slide to the extended position pushes the blade holder to the extended position where the blade extends out of the knife body. With the cutting action an upwards force is created against the blade, and with it the abutting section or extension of the blade holder, is moved in a direction perpendicular to the longitudinal axis of the knife handle, in such a manner that the trigger slide and blade holder are no longer in contact with each other and therefore decoupled. A spring connected to the blade holder subsequently retracts the blade holder with the blade back into the knife body into the retracted position independent of the position of the trigger slide.

The extensions are formed by small pieces of plastic or metal that can break or bend during use, effectively making the knife unusable as the movement of the trigger slide will no longer move the blade holder.

In addition it is possible that the abutting sections or extensions can get stuck, so that the cutting action will no longer decouple the trigger slide and the blade holder, preventing the blade from automatically retracting back into the knife body.

SUMMARY OF THE INVENTION

It is an object of the present invention to provide a simple coupling mechanism that does not include any parts that can break or wear off or get stuck together, while providing the safety features of the known knives. Another object of the invention is to provide a simple and inexpensive safety knife.

Preferred embodiments of the safety knife are described according to the drawings. These preferred embodiments are to be understood as exemplary embodiments and any detailed description shall not be interpreted as limiting. Alternate embodiments obvious to one skilled in the art will not be described in detail or will be omitted to prevent the relevant details of the invention to be overlooked.

DETAILED DESCRIPTION OF THE INVENTION

Figure 1:
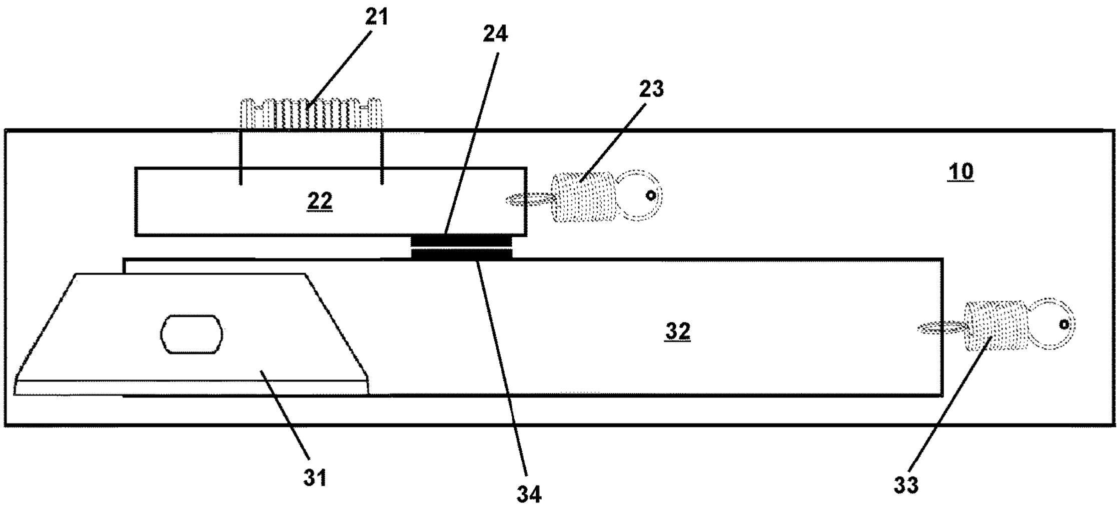
FIG. 1 Shows the safety knife with the trigger slide in the rear position and the blade holder in the safety position.
Figure 2:
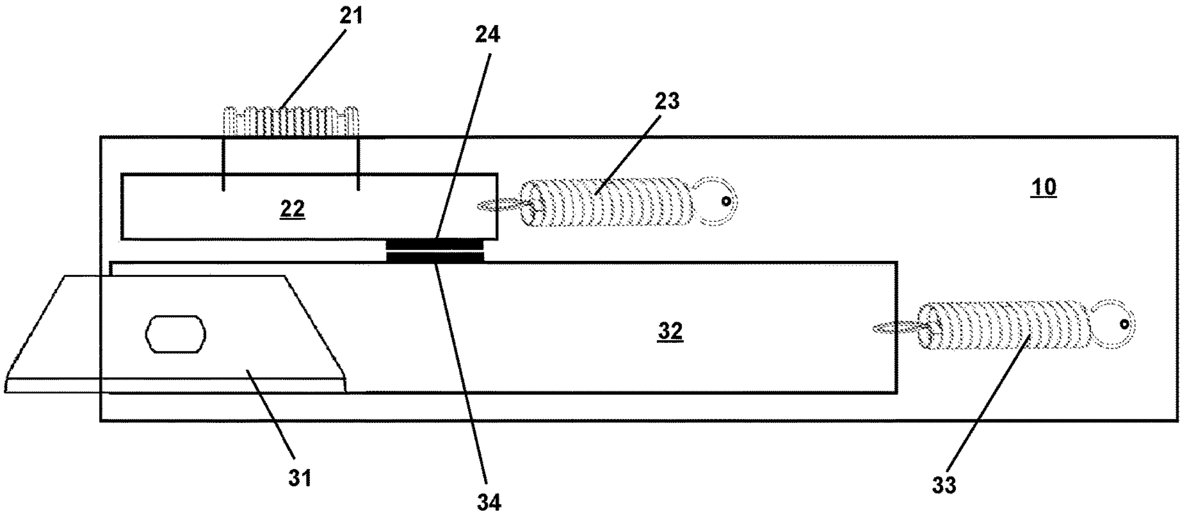
FIG. 2 Shows the safety knife with the trigger slide in the front position and the blade holder in the extended position.

The present invention discloses a safety knife comprising an oblong knife body 10 with a cavity and an opening at a front end through which the blade can be extended for use as shown in FIG. 1 and FIG. 2. A trigger mechanism operable outside of the knife body 10 consists of a trigger button which is connected to a trigger slide 22 located inside the cavity of the knife body. In a preferred embodiment both the trigger button and the trigger slide 22 are slidable from a rear position to a front position along a longitudinal axis of the knife towards the opening. In further embodiments the trigger button is movable in other directions, for example towards the rear of the knife body or at a ninety degree angle to the longitudinal axis of the knife body, e.g. towards or away from the center of the knife body. In these configurations a translation means transfers the movement of the trigger button to the trigger slide 22 from the rear position to the front position. A trigger spring 23 connects the trigger slide 22 to the knife body 10 and permanently forces the trigger slide 22 to the rear position. A blade holder 32 is located in the cavity and movable along the longitudinal axis of the knife. Said blade holder 32 is provided for securely holding a blade 31, and moving said blade 31 from a safety position (FIG. 1), where the blade 31 is completely within the knife body 10, to an extended position (FIG. 2), where the blade 31 extends out of the opening at the front end of the knife body 10 for use.

Figure 3:
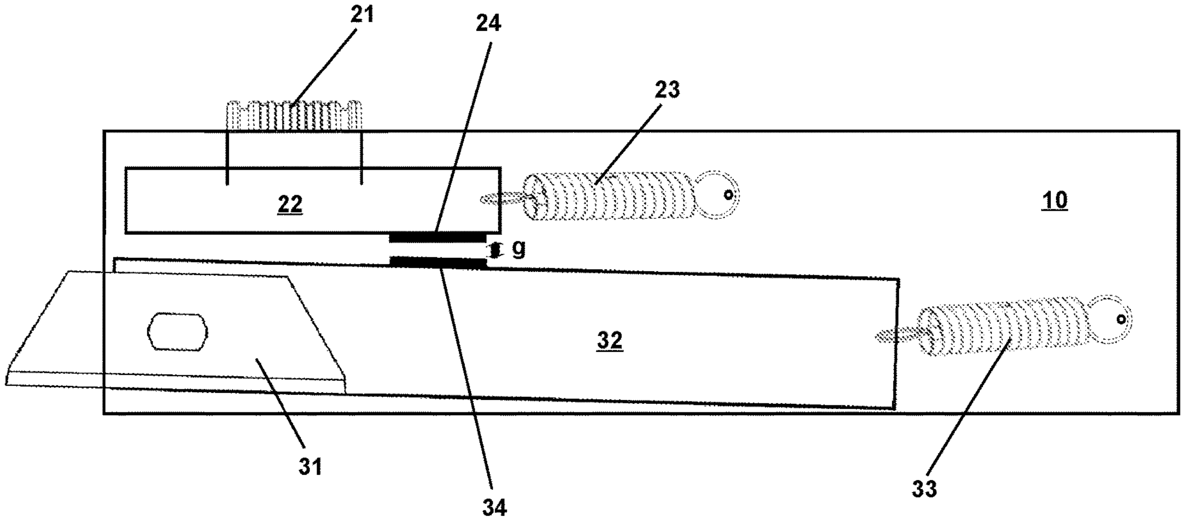
FIG. 3 Shows the safety knife with the trigger slide in the front position and the blade holder where the coupling surfaces are separated (decoupled position).

In the extended position the blade holder 32 is rotatable into a rotated position (FIG. 3), where the front end of the blade holder 32 is forced in an upwards direction U, away from the cutting edge as soon as the cutting edge is placed onto or into the material to be cut. The rear end of the blade holder 32 is moved in the opposite downwards direction D with respect to the knife body 10, creating a gap g between the blade holder 32 and the trigger slide 22.

In a preferred embodiment a pivot triangle 41 (FIG. 5) is fixed to the knife body 10 at a position located anywhere between the front end and the rear end of the blade holder 32, which forces the blade holder 32 to rotate about this pivot point. Due to the rotation of the blade holder 32 the rear end of the blade holder is moved in the opposite downwards direction D with respect to the knife body 10. A pivot pin 42 (FIG. 6) can be fixed to the knife body 10 or the blade holder 32. To allow the blade holder 32 to move between the safety position and the extended position a pivot recess 43 is formed as a channel in the knife body 10 if the pivot pin 42 is fixed to the blade holder 32 or in the blade holder 32 if the pivot pin 42 is fixed to the knife body 10.

Figure 4:
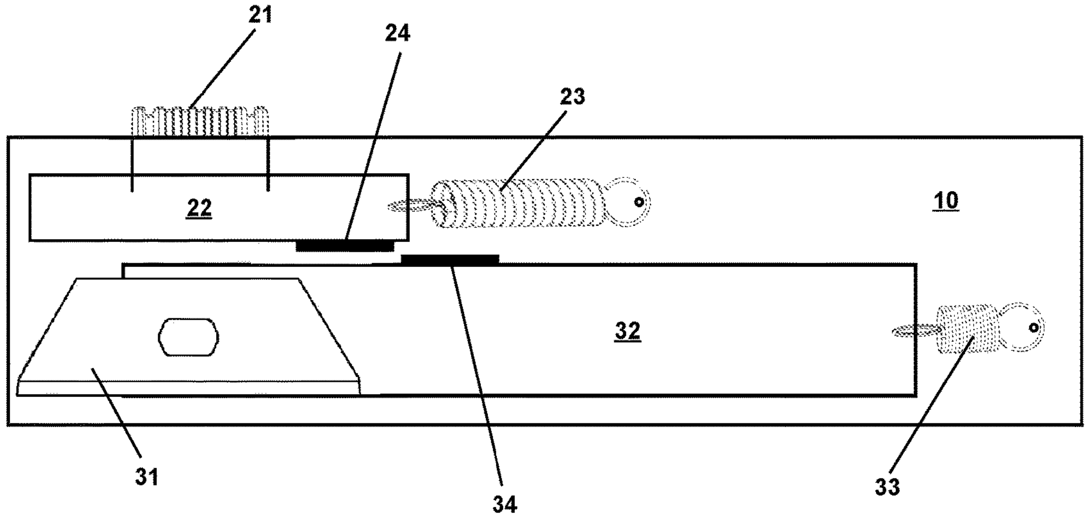
FIG. 4 Shows the safety knife with the trigger slide in the front position and the blade holder in the safety (retracted) position.
Figure 5:
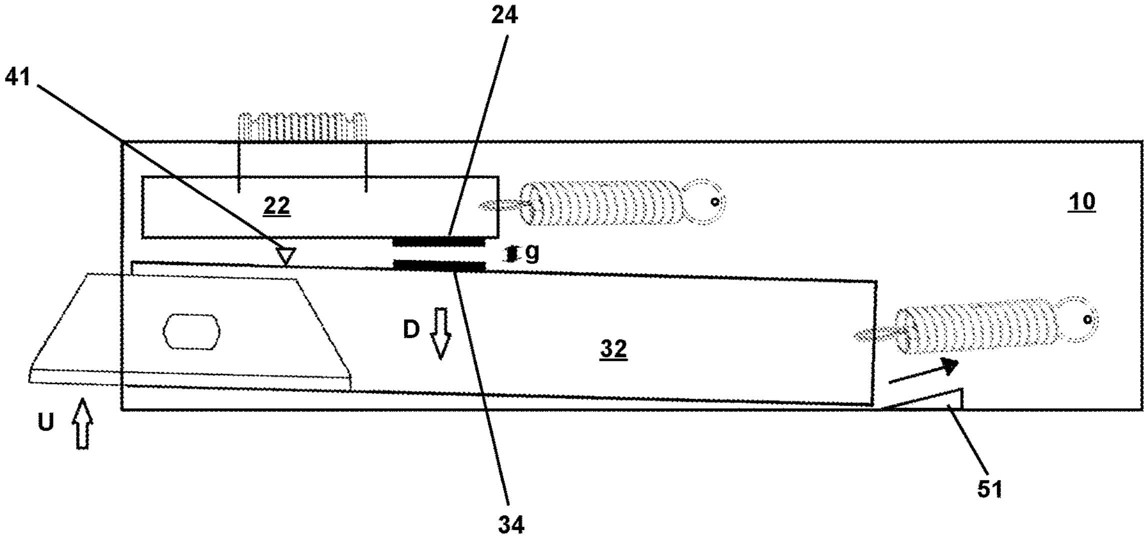
FIG. 5 Shows the safety knife in the decoupled position, where the blade holder is rotated by a pivot triangle.
Figure 6:
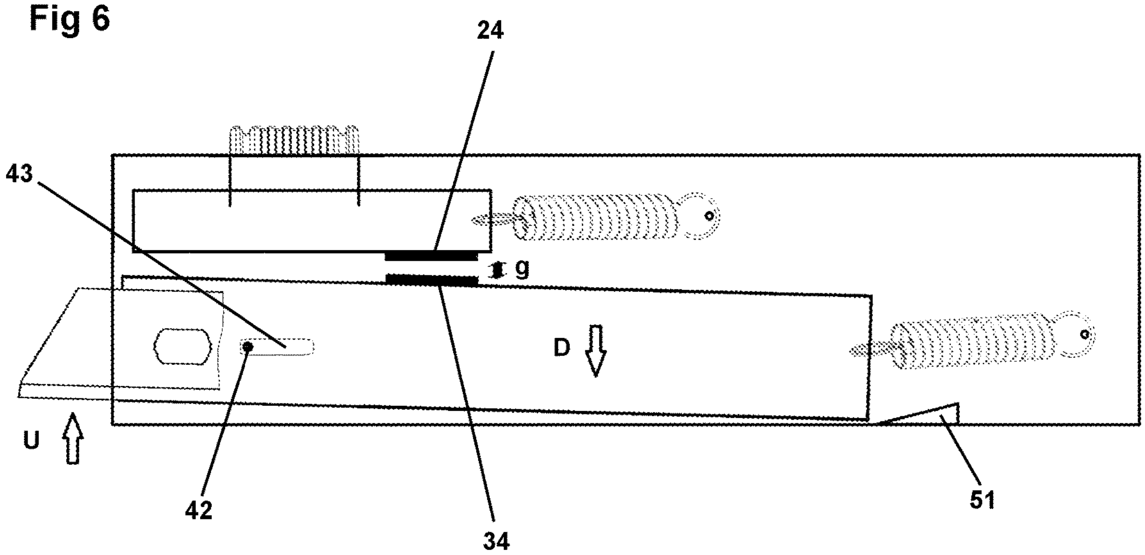
FIG. 6 Shows the safety knife in the decoupled position, where the blade holder is rotated around a pivot knob.

A blade spring 33 connects the blade holder 32 to the knife body 10 and permanently forces the blade holder 32 to the safety position independently of the trigger slide 22 as shown in FIG. 4. In a possible embodiment a ramp 51 is formed on the lower part of the knife body 10 as shown in FIG. 5 and FIG. 6, forcing the blade holder 32 back to a position parallel to the trigger slide 22, when the blade holder 32 returns to the safety position.

According to the invention the trigger slide 22 is equipped with a trigger coupling surface 24 and the blade holder 32 is equipped with a holder coupling surface 34. In the safety position as shown in FIG. 1 the two coupling surfaces 24, 34 are in contact with each other in a plane essentially parallel to the longitudinal axis of the knife body 10. A coupling means connects said coupling surfaces 24, 34 in a way that a movement of the trigger slide 22 causes the same movement of the blade holder 32 at least in a direction towards the front of the knife body 10, when the two coupling surfaces 24, 34 are in contact with each other as is shown in FIG. 2.

Figure 7A:
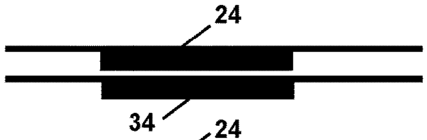
FIG. 7*a*, 7*b* Shows different arrangements magnets used as coupling surfaces FIG. 8 Shows an example of a magnet used as part of the coupling means, which can be moved away and towards the coupling surface.
Figure 7B:
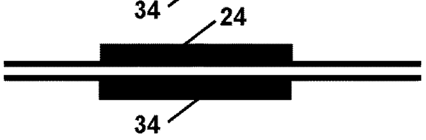
Figure 8:
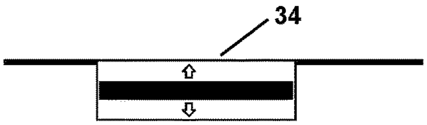

In a preferred embodiment the coupling means comprises one magnet and one piece of magnetic material or two magnets with opposite polarity. These two components are located on the two coupling surfaces 24, 34 and form a strong connection when they are in contact with each other. In other embodiments at least one of the magnets is an electromagnet. Several arrangements of these magnets or other coupling means forming the coupling surfaces 24, 34 are shown in FIG. 7*a* and FIG. 7*b*. In a further embodiment at least one of the magnets is located in a cavity of the trigger slide 22 or the blade holder 32 and can be moved towards and away from the coupling surface as shown in FIG. 8 for the blade slide 32. The position of the magnet within the cavity can be adjustable by any suitable means, e.g. a screw, or it can be connected to the trigger slide 22 or the blade holder 32 with a spring forcing the magnet away from the coupling surface.

To allow a simple assembly of the safety knife the trigger slide 22 and the blade holder 32 can be equipped with cavities for receiving the coupling means (magnets or magnetic material). Or the coupling means can be firmly connected to the trigger slide 22 or the blade holder 32 with any suitable means, e.g. bonding agent, screw, soldering point.

The coupling means can consist of a hook and loop fastener, adhesives or any other means with a strong adhesion when the two coupling surfaces 24, 34 are in contact with each other.

In further embodiments the holder coupling surface 34 is located on a protrusion of the blade holder 32 and the trigger coupling surface 24 is located in a recess of the trigger slide 22, or the holder coupling surface 34 is located in a recess of the blade holder 32 and the trigger coupling surface 24 is located on a protrusion of the trigger slide 22 and said protrusion fits into said recess.

In another embodiment the holder coupling surface 34 is connected to the blade holder 32 with a spring, said spring allowing the holder coupling surface 34 to protrude from the blade holder. The trigger coupling surface 24 can optionally be located in a recess of the trigger slide 22 allowing said holder coupling surface 34 to fit into said recess. The recess in which the coupling means, which can be a magnet, is placed can also be larger than the magnet as shown in FIG. 8. In this embodiment the magnet can either move freely between a position close to the coupling surface and away from the coupling surface 24, 34, or a spring can be used forcing the magnet to a position away from the coupling surface 24, 34.

In a preferred embodiment a gap g is formed between the holder coupling surface 34, when the blade holder 32 is rotated into the extendable rotatable position, and the trigger coupling surface 24, when the trigger slide 22 is in the front position, is such that the magnetic force of the coupling means is negligible.

In additional embodiments both coupling surfaces 24, 34 are located in recesses in the trigger slide 22 and the blade holder 32. They are connected to the trigger slide 22 and the blade holder 32 respectively with springs allowing the coupling surfaces to protrude from or partially come out of the recesses of the trigger slide 22 and the blade holder 32. In this configuration the trigger slide 22 and the blade holder 32 do not have any contact point aside from the connection formed when both coupling surfaces 24, 34 are extended due to the magnetic force against the forces of the two springs. As soon as the blade holder 32 is rotated and the gap g between the two coupling surfaces increases, the force of the springs should exceed the magnetic force, thus disconnecting the coupling surfaces 24, 34, which are then retracted back into the trigger slide 22 and the blade holder 32 respectively.

The invention claimed is:

1. A safety knife comprising:

a knife body (10) with a cavity and an opening at a front end, a trigger mechanism operable outside of the knife body (10) including a trigger slide (22) located in the cavity and slidable from a rear position to a front position along a longitudinal axis of the knife, a trigger spring (23) connecting the trigger slide (22) to the knife body (10), a blade holder (32) for securely holding a blade (31), said blade holder (32) movable along the longitudinal axis of the knife from a safety position, where the blade (31) is completely within the knife body (10), to an extended position, where the blade (10) extends out of the opening at the front end of the knife body (10), and rotatable in the extended position into a rotated position, a blade spring (33) connecting the blade holder (32) to the knife body (10) and forcing the blade holder (32) to the safety position, wherein said trigger slide (22) is equipped with a magnetic trigger coupling surface (24) formed on one side of said trigger slide and said blade holder (32) is equipped with a magnetic holder coupling surface (34) formed on one side of said blade holder, said magnetic trigger coupling surface and said magnetic holder coupling surface face each other, said magnetic trigger coupling surface and said magnetic holder coupling surface are in contact with each other in a plane essentially parallel to the longitudinal axis of the knife body (10) and said magnetic trigger coupling surface and said magnetic holder coupling surface are connected by a magnetic coupling means force when in contact with each other, wherein movement of said trigger slide (22) from the rear position to the front position causes said blade holder (32) to move to the extended position, and a ramp (51) is retained in the knife body (10) to move an end of the blade holder (32) into said knife body (10) when said blade holder is retracted.

2. The safety knife according to claim 1, wherein a distance between the magnet holder coupling surface (34), when the blade holder (32) is rotated into the extendable rotatable position, and the magnet trigger coupling surface (24), when the trigger slide (22) is in the front position, such that the magnetic force between the magnet trigger coupling surface (24) and the magnet holder coupling surface (34) is minimized.

* * * * *